(12) United States Patent
McKinney et al.

(10) Patent No.: US 8,719,169 B2
(45) Date of Patent: May 6, 2014

(54) DIGITAL MEDIA PERSONALIZATION

(75) Inventors: Steven Victor McKinney, Ross, CA (US); Ron Severdia, San Anselmo, CA (US)

(73) Assignee: Metrodigi, Inc., Larkspur, CA (US)

( * ) Notice: Subject to any disclaimer, the term of this patent is extended or adjusted under 35 U.S.C. 154(b) by 0 days.

(21) Appl. No.: 13/447,114

(22) Filed: Apr. 13, 2012

(65) Prior Publication Data

US 2013/0275254 A1    Oct. 17, 2013

(51) Int. Cl.
G06F 21/00    (2013.01)
G06Q 20/00    (2012.01)

(52) U.S. Cl.
USPC ............................................................ 705/51

(58) Field of Classification Search
USPC .............. 705/51, 16, 21, 59, 71; 380/44, 262, 380/278, 279
See application file for complete search history.

(56) References Cited

U.S. PATENT DOCUMENTS

| 4,772,782 A * | 9/1988 | Nonat ............................ 235/380 |
| 2008/0168073 A1 * | 7/2008 | Siegel et al. ................... 707/100 |
| 2012/0240085 A1 * | 9/2012 | Sim et al. ....................... 715/864 |

* cited by examiner

*Primary Examiner* — Dante Ravetti
(74) *Attorney, Agent, or Firm* — Carr & Ferrell LLP (57) ABSTRACT

Systems, methods, and media for digital media personalization are provided herein. Methods may include selecting an upcoming digital media publication to be published over a network, selecting prior to publishing the digital media publication, a portion of the digital media publication that is to be personalized after the digital media publication is published, establishing, prior to publishing the digital media publication, characteristics for personalization of the portion of the digital media publication, and publishing the personalizeable digital media publication over the network.

12 Claims, 7 Drawing Sheets

DIGITAL MEDIA PERSONALIZATION

CROSS REFERENCE TO RELATED APPLICATIONS

This non-provisional patent application is related to U.S. Non-Provisional patent application Ser. No. 13/355,451, entitled "Systems, Methods, and Media for Generating Electronic Books," which is hereby incorporated by reference herein in its entirety.

FIELD OF THE TECHNOLOGY

Embodiments of the disclosure relate to digital media personalization. The present technology may be utilized to generate digital media publications that are personalizeable. A personalizeable digital media publication may include any digital publication such as an e-book, which may be autographed or otherwise personalized by its author or another individual. The present technology generates a digital media publication with personalizeable portions, allows authors (or other individuals) to add personalized content to the digital media publication such as autographs, audio and/or visual media, temporal and geo-location data—just to name a few. The present technology also stores the personalized content in the digital media publication.

BACKGROUND OF THE DISCLOSURE

Digital media, such as electronic books, are becoming more widely accepted and their sales are beginning to eclipse legacy printed publications. Because legacy printed publications involve a physical medium such as paper, authors may easily personalize the media by way of an autograph, inscription, or other indicia that is applied directly onto the paper. For example, an author may sign the front cover of a book. In other examples, a program for a stage show may be signed by a member of the cast. What is needed are systems and methods for personalizing digital media, such as e-books, audio files, audiovisual files, and visual files—just to name a few. These and other advantages of the present technology will hereinafter be described.

SUMMARY OF THE DISCLOSURE

According to some embodiments, the present technology may be directed to methods for managing a personalizeable digital media publication. The methods may comprise: (a) selecting an upcoming digital media publication to be published over a network; (b) selecting prior to publishing the digital media publication, a portion of the digital media publication that is to be personalized after the digital media publication is published; (c) establishing, prior to publishing the digital media publication, characteristics for personalization of the portion of the digital media publication; and (d) publishing a personalizeable digital media publication over the network.

According to other embodiments, the present technology may be directed to systems for personalizing a digital media publication. The systems may comprise: (a) a memory for storing executable instructions; (b) a processor for executing the instructions stored in memory to: (i) select prior to publishing a digital media publication, a portion of the digital media publication that is to be personalized; (ii) establish, prior to publishing the digital media publication, characteristics for personalization of the portion of the digital media publication; and (iii) publish a personalizeable digital media publication over a network.

According to additional embodiments, the present technology may be directed to an e-book reader device that may comprise: (a) a touchscreen device; (b) a memory for storing executable instructions; (c) a processor for executing the instructions to: (i) receive a personalizeable digital media publication, the personalizeable digital media publication having characteristics for personalization of a portion of the digital media publication; (ii) place the portion of the personalizeable digital media publication in an editable mode; (iii) receive personalization input according to the characteristics for personalization via the touchscreen device; and (iv) store a personalized digital media publication in any of the memory, a remote storage media, or combinations thereof.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown in block diagram form only in order to avoid obscuring the disclosure.

Generally speaking, the present technology relates to the generation, management, publication, and subsequent personalization of personalizeable digital media publications, hereinafter referred to as "publications." A publication may comprise any type of electronic document such as a book, a periodical, a playlist, a bulletin, a program, and/or a guide—just to name a few. The publication is "personalizeable" because it may include a mechanism that allows for the insertion of personalized content within the publication. Activating the personalizing feature of the publication causes the display of a graphical user interface that receives personalized content such as an autograph, a message, an image, an audio file, a video file, and/or any combinations thereof.

The creation and management of publications may occur at a central location such as a web server that publishes digital media publications. Additionally, a downloadable program, plug-in, or module may execute on the client device (e.g., reader device) to allow individuals to execute the personalizing features of the publications.

The present technology may employ geolocation stamping and/or time stamping to further enhance the received personalized content. For example, when an electronic book is signed by an author, the present technology may stamp the location (e.g., latitude and longitude, city, state, etc.) and time (e.g., time and date) proximate the signature. In some embodiments, end users may capture media such as photographic images, videos, or audio messages of individuals with their client device (such as an e-reader, tablet, laptop, mobile phone, etc.). The captured media may be included as personalized content along with any inscriptions or autographs from other individuals in the photograph.

These and other advantages of the present technology will be described in greater detail with reference to the collective FIGS. 1-5.

Figure 1:
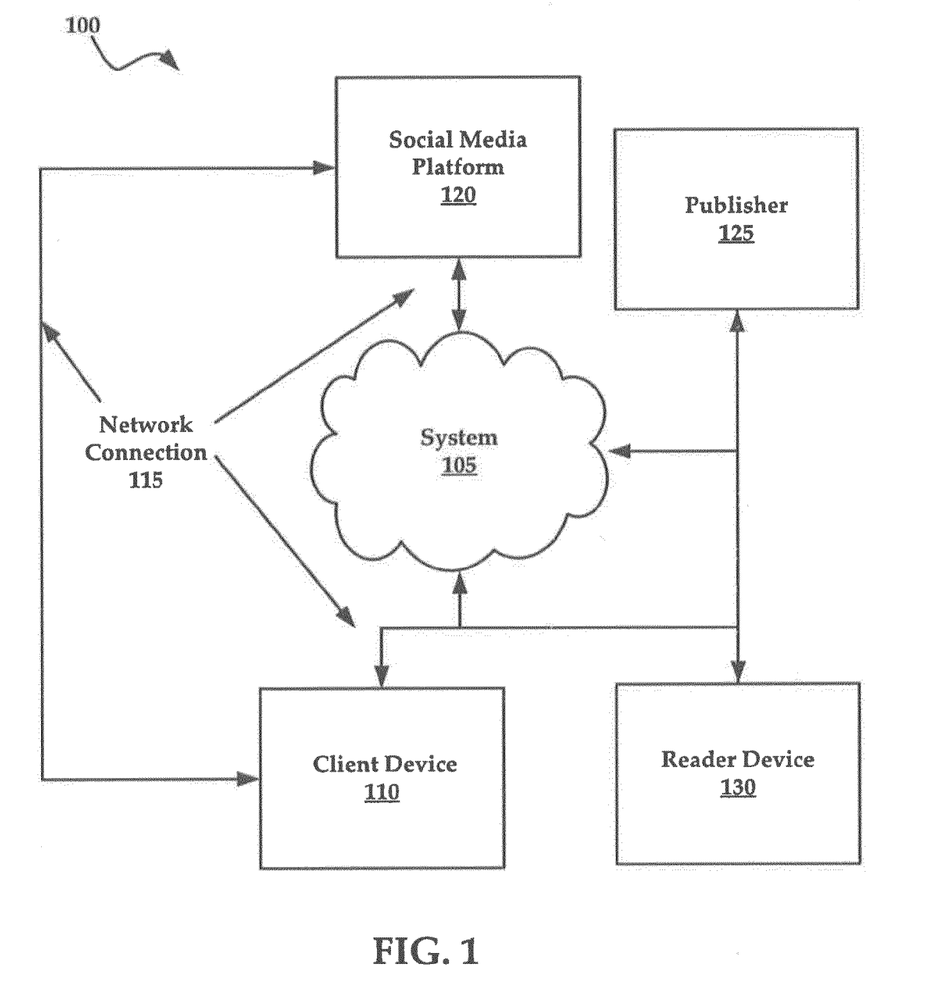
FIG. 1 illustrates an exemplary system for practicing aspects of the present technology.

FIG. 1 illustrates an exemplary architecture 100 for practicing aspects of the present technology. The architecture 100 may include a personalizeable digital media publication management system, hereinafter referred to as "system 105" that may be implemented in a cloud-based computing environment. A cloud-based computing environment is a resource that typically combines the computational power of a large grouping of processors and/or that combines the storage capacity of a large grouping of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

In other embodiments, the system 105 may include a distributed group of computing devices such as web servers that do not share computing resources or workload. Additionally, the system 105 may include a single computing system that has been provisioned with a plurality of programs that each produces instances of event data.

Publication developers and/or publishers may access and interact with the system 105 via a client device 110 using a web-based interface, as will be discussed in greater detail infra. The system 105 may communicatively couple with the client device 110 via a network connection 115. The network connection 115 may include any one of a number of private and public communications mediums such as the Internet.

Additionally, the system 105 may publish personalized content, notifications, and the like to a third party social media platform, such as social media platform 120. In some embodiments, the system 105 may also publish or transmit publications to various third party distributors or publishers, such as a publisher 125. It will be understood that in some instances, the publications generated by the system 105 may be exported to, or stored in a storage media such as a content repository.

The system 105 may also communicatively couple with reader devices, such as reader device 130. The reader device 130 may comprise any of an e-reader, a tablet personal computer, a laptop, a mobile communications device, or any other computing device. As will be discussed in greater detail below, the reader devices 130 may each comprise a downloadable program, plug-in, or other executable instructions that allow individuals to personalize a publication by interacting with the reader device 130.

The system 105 may be generally described as a mechanism for managing personalizeable digital media publications. More specifically, the system 105 may generate personalizeable digital media publications and facilitate the publishing of these personalizeable digital media publications. The system 105 is provided with an application 200 that will be described in greater detail with reference to FIG. 2.

Figure 2:
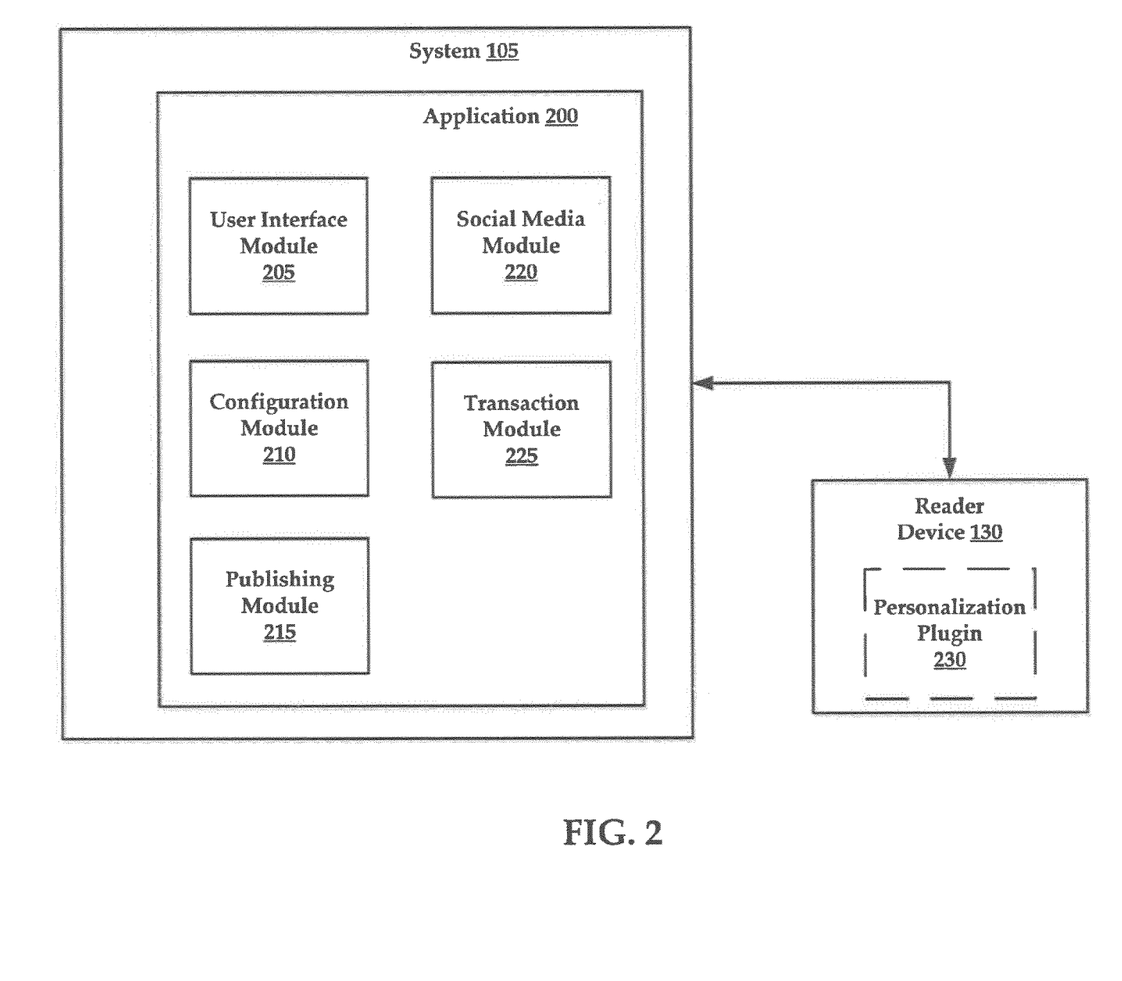
FIG. 2 illustrates an exemplary application for managing a personalizeable digital media publication.

FIG. 2 illustrates the application 200 that may be executed to manage personalizeable digital media publications. In general, the application 200 may be executed by a processor to an upcoming digital media publication that is to be published over a network. Upon selection of the desired publication, the application 200 may then select, prior to publishing the digital media publication, a portion of the digital media publication that is to be personalized after the digital media publication is published. That is, the personalization of the publication may occur after the document has been published. More specifically, in some instances the publication may be personalized after the publication has been downloaded onto a reader device 130.

Prior to publication of the digital media publication, the application 200 may be executed to establish characteristics for personalization of a portion of the digital media publication. In some embodiments the characteristics determine how the publication can be personalized. For example, the characteristics may specify that the publication may be signed by only a single individual, or in other instances, a plurality of individuals. The selection and establishment of some exemplary characteristics will be described in greater detail below.

Once the characteristics for how the publication can be personalized have been established, the system 105 generates a personalizeable digital media publication having the desired characteristics. The personalizeable digital media publication may then be published over the network to a publishing location such as an online retailer, content management repository, or may be published and transmitted directly to an end user and/or consumer.

According to some embodiments, the application 200 may generally include a user interface module 205, a configuration module 210, a publishing module 215, a social media module 220, and a transaction module 225. It is noteworthy that the application 200 may include additional modules, engines, or components, and still fall within the scope of the present technology. As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules of the application 200 may include separately configured web servers. Also, the application 200 may be provisioned with a cloud, such as in some embodiments of the system 105.

An end user, such as a publication developer or publisher, may interact with the application 200 via one or more graphical user interfaces that are provisioned as web-based interfaces. The web-based interface(s) may be generated by the user interface module 205. It will be understood that the user interface module 205 may generate a plurality of different graphical user interfaces that allow end users to generate personalizeable publications. Examples of graphical user interfaces that are generated by the user interface module 205 are provided in FIGS. 3A-C, which will all be described in greater detail infra.

It will be understood that the generation of electronic documents is generally described in greater detail in co-pending U.S. patent application Ser. No. 13/355,451.

In conjunction with the user interface module 205, the configuration module 210 may be executed to allow publication developers to define which portions of a publication may be personalized and also the means by which the portions may be personalized.

In a common example, a portion of the publication that may be personalized may comprise the title page of an electronic book. This example is similar to the typical method used by an author to sign a hardcopy of a book. In another instance, the portion of the publication may comprise individual pages of a program that are associated with an individual. For example, a digital program publication for a sporting event may include individual pages for each team member. Therefore, the characteristics defined by the publisher may allow for each team member to sign their own individual page.

In addition to defining the personalizeable portions and the characteristics for personalization, the configuration module 210 may also allow publishers to define other characteristics for personalization such as allowing for geolocation/time stamping of a personalization and/or whether the personalization may be edited, modified, or deleted. In other instances, the configuration module may require that the individual input a pin code or other security feature, which insures that the individual inputting the personalization is authorized to do so. The configuration module 210 may define the types of personalized content that may be allowed in the publication. For example, the publication may allow for an inscribed object such as an autograph, saying, quote, message, or other similar written material. Other personalized content may comprise an image file, a video file, an audio file, and combinations thereof. These types of personalized content media may be captured by the reader device or uploaded to the reader device from a local or remote location.

Additionally, time-based limitations on when a publication may be personalized may also be established as a characteristic. For example, if a particular sporting event is occurring for only a brief period of time, the publication may only be personalized while the sporting event is being conducted. By way of non-limiting example, the United States Golf Association may create and distribute digital program publications regarding an event such as the US Open golf tournament. To prevent enthusiasts from asking for autographs or other types of personalization for their publications, the characteristics established for the publication may only allow for the publication to be personalized on practice days, such as Monday and Wednesday.

Once the personalization characteristics have been established for the publication, the publishing module 215 may be executed to publish the personalizeable digital media publication over a network. Again, it is noteworthy that the publication has been referred to as "personalizeable" because the publication has yet to be personalized by an individual. As mentioned previously, the publication may be published to a publisher's website, a content repository, an online retailer, and/or and end user.

Once the publication has been published, it may be downloaded onto the reader device 130 from a content repository, such as the webserver to which the publication has been published. After downloading, the personalizeable publication may then be personalized. Again, the reader device 130 may download an application, plugin, or other tool that allows the reader device 130 to display and receive personalized content into the publication. For example, the application may communicatively couple with a personalization plugin 230 that executes on the reader device 130. In other instances the ability to receive and process personalized content may be built into the publication itself such that when a reader application on the reader device 130 opens and displays the publication, the graphical user interfaces for personalizing the publication are rendered by standard reader applications, such as Adobe Reader®, without additional hardware or software support.

Figure 3A:
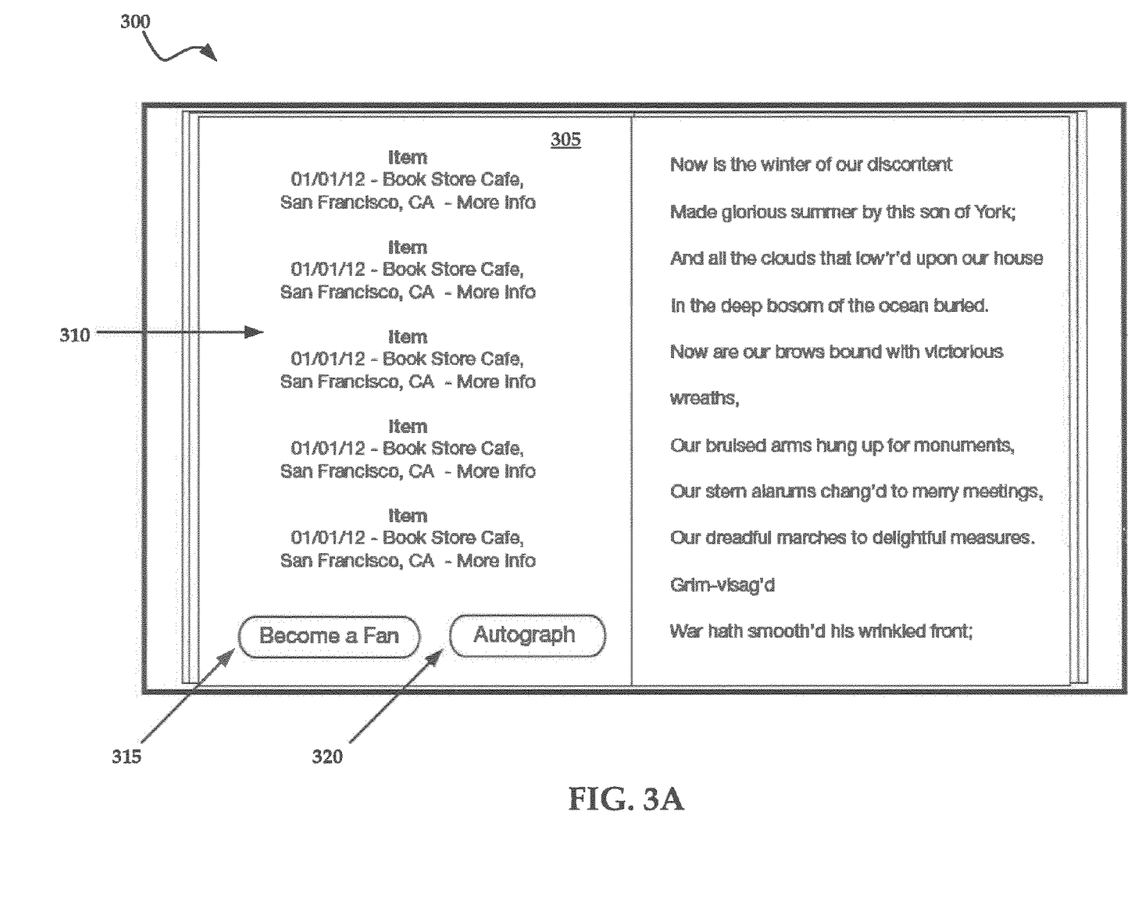
FIG. 3A is an exemplary fan engagement page of a personalizeable digital media publication.
Figure 3B:
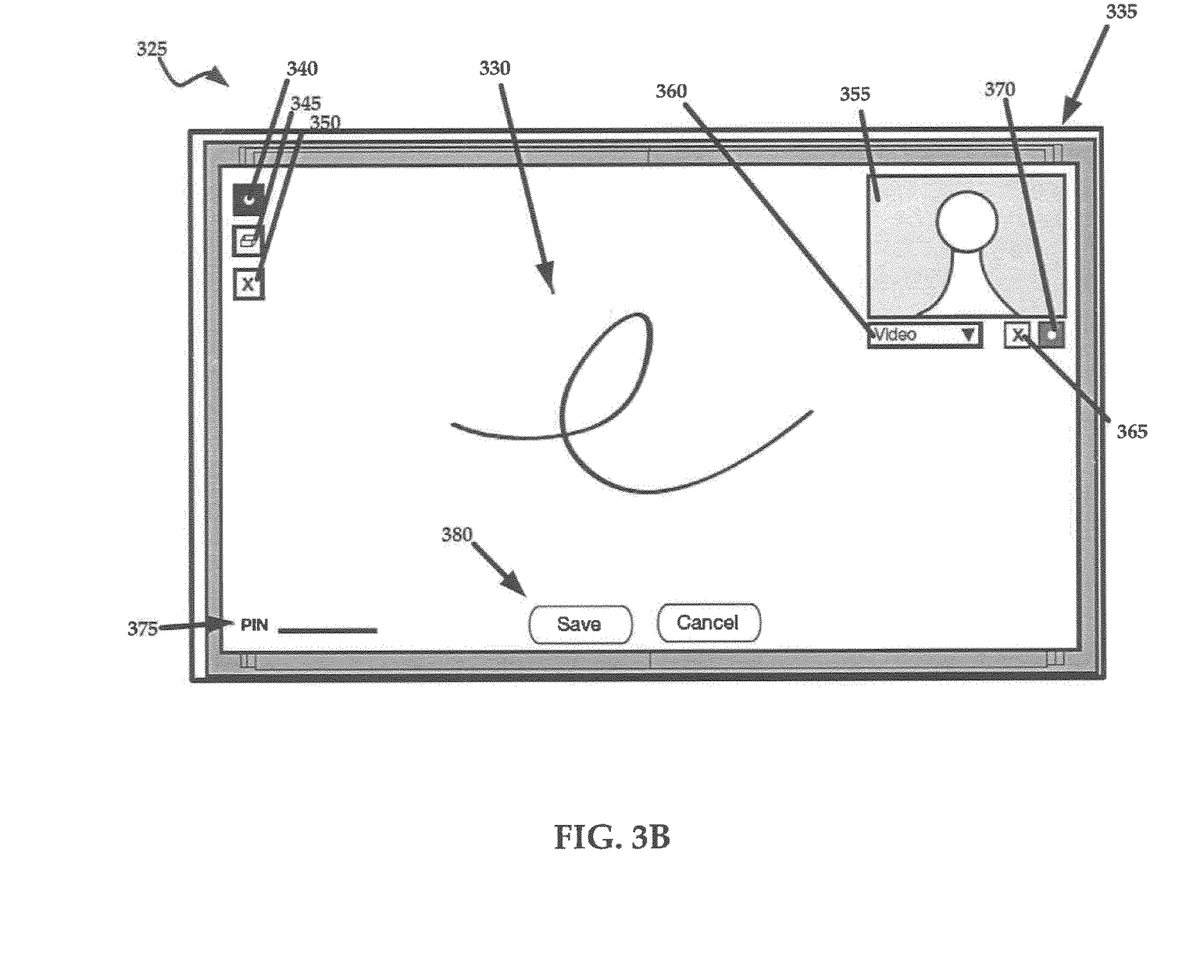
FIG. 3B is an exemplary graphical user interface that allows an author to personalize a personalizeable digital media publication.
Figure 3C:
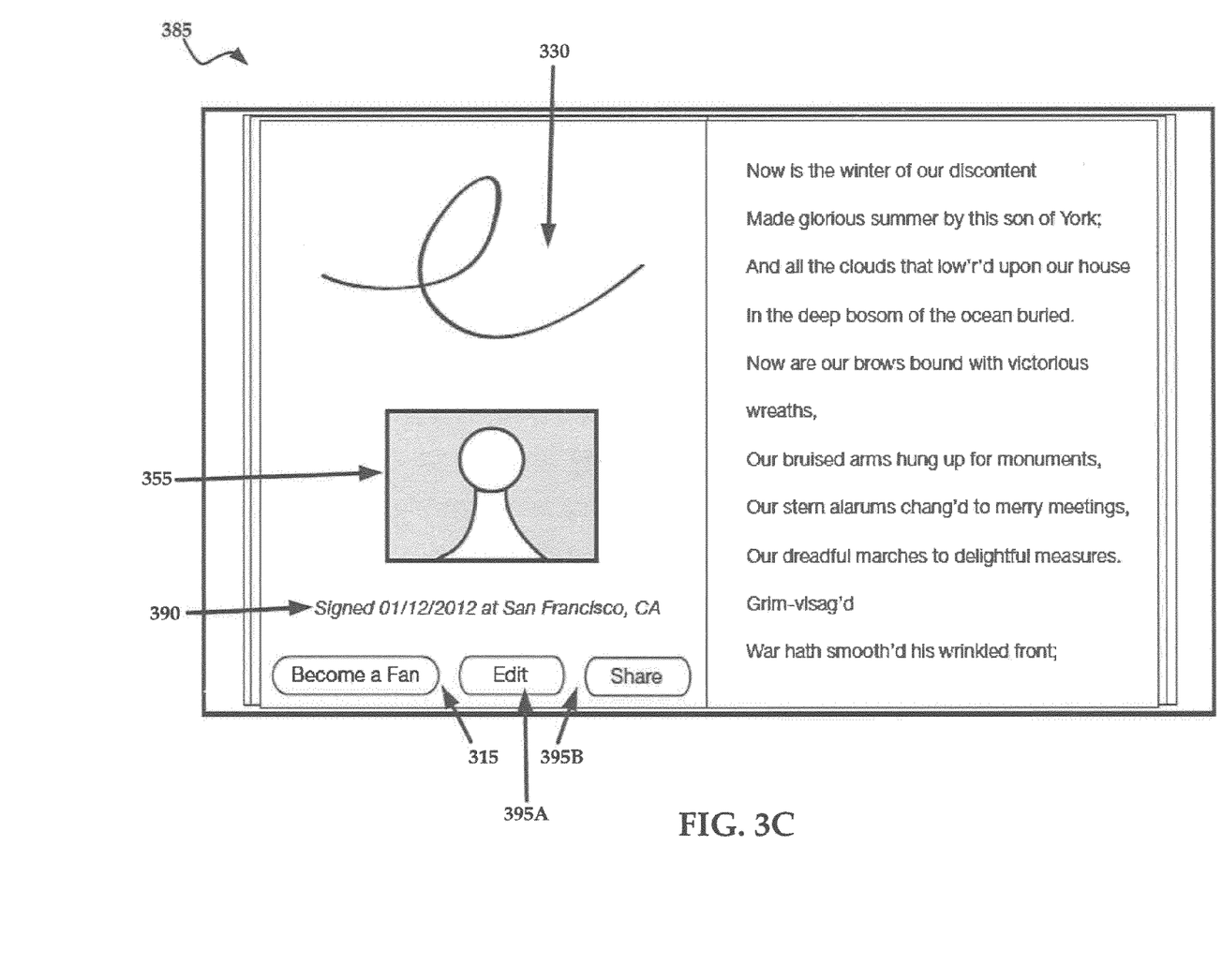
FIG. 3C is an exemplary personalized page of a personalizeable digital media publication.

Referring now to FIGS. 2-3C collectively, according to some embodiments, when a reader device opens a publication 300, a fan engagement page 305 is shown. The fan engagement page 305 includes a book tour schedule 310, as well as a "Become a Fan" button 315 and an "Autograph" button 320. Again, the selection of the fan engagement page and the location and features of the buttons were previously defined by a publication developer via the configuration module 210.

As mentioned previously, the publication developer may designate page(s) in a publication that can be autographed using a metatag, a button, and/or other indicator, which in some instances includes a blank page at the beginning of the publication.

Clicking on the button 315 may direct the reader to another location (possibly via a browser application) where the reader may obtain more information, bonus content, or register for customized information/updates—just to name a few features.

Upon selecting the button 320, the personalization plugin 230 may be executed to place the publication into an edit mode, also known as "autograph mode." A interface 325 may be overlaid upon the publication 300. In some instances the size of the interface 325 may depend upon the type of personalization content that is allowed to be input into the interface 325. If the characteristics of personalization for the publication only allow for an autograph, the interface 325 may be relatively small compared to a publication having characteristics that allow for insertion of media content or messages.

In general, the interface 325 is shown as having a free-form scribing area 330 as well as a media template 335. The interface 325 may include control buttons such as autograph mode button 340 that when toggled ensures that an individual who is personalizing the publication can input personalized content. The interface 325 may comprise an eraser button 345 that clears out the free-form scribing area 330, and a reset button 350 that reset the entire interface 325.

The media template 335 may comprise a media frame 355, a media type selector 360, a reset button 365 that clears out the media currently in the media frame 355, as well as a record/play/pause button 370 that allows the individual to review or record personalized media content such as video, images, audio, and combinations thereof.

The interface 325 may also include a security input 375 where individuals may be required to input an identifier to verify access rights for inputting personalized information. For example, an author of a book may be provided a special access code that they must enter into the interface 325 prior to saving any personalized content into the publication.

When the individual is done personalizing the publication, the save button 380 may be selected to save the personalization into the publication. It is noteworthy that based upon the characteristics for personalization established by the developer, the saving of personalized content may be permanent (no further changes may be made). That is, the publication may be placed into a permanent mode. In other instances, the individual may be allowed to go back into the publication and edit the personalized content. Additionally, the autograph may be overlaid upon any portion of a page. Similarly to a physical autograph in a book, the autograph may at least partially overlap objects on a page such as text. In other instances, the autograph may be placed behind text to produce a watermarking effect.

As mentioned previously, the personalization plugin 230 may gather geolocation and/or timestamp information from the reader device 130, or from another source (such as the system 105) via the network connection 115.

Once the personalized content has been saved, a personalized page 385 may be generated for the publication. The personalized page 385 may comprise the autograph input into the free-form scribing area 330 as well as the media input into the media frame 355 of the interface 325. A geolocation/timestamp 390 may be placed below the media. As mentioned above, the personalized page 385 may include the "Become a Fan" button 315, an edit button 395A that allows the individual to go back and edit the personalized content that was input into the interface 325, as well as a share button 395B.

Again, while the above described embodiment contemplates the use of a personalization plugin 230 it will be understood that the publication itself may be configured to perform the features of the personalization plugin 230. Therefore, the personalization plugin 230 may not be required.

Upon receiving and saving personalized content for a publication, the social media module 220 may be executed to provide notification of the personalized content to at least one social media platform, such as the social media platform 120 (FIG. 1). The notification may include data indicative of the personalized content, the individual that provided the personalized content, and or the recipient of the personalized content (e.g., the reader). By way of non-limiting example, a notification may comprise a message which states that a particular author autographed a reader's e-book on a specific data, at a bookstore located in a particular town. The notification may be added to the reader's news-feed, status, wall, and/or other similar social media mechanism that would be known to one of ordinary skill in the art. According to some embodiments, the system 105 and the social media platform may communicate with one another via an application programming interface ("API").

In other embodiments, the transaction module 225 may be executed to define fees or other compensation in exchange for the personalization of a publication. For example, an author may specify that while autographs are free of charge, personalized messages may be charged at a first amount. Likewise, a personal photograph of the author and the reader may be charged at a second and higher amount than the first amount. Different combinations of personalized content may each have different monetary values associated therewith. The transaction module 225 may be configured to modify the characteristics of the publication. For example, the publication may be initially configured only to allow for autographs, but if the reader purchases additional personalization, the transaction module 225 may communicate additional characteristics to the reader device 130 that allow the publication to be further personalized, such as allowing both an autograph and a personalized photo of the author.

The transaction module 225 may also receive payment information from a reader via the reader device 130 using methods that would be known to one of ordinary skill in the art with the present disclosure before them.

Figure 5:
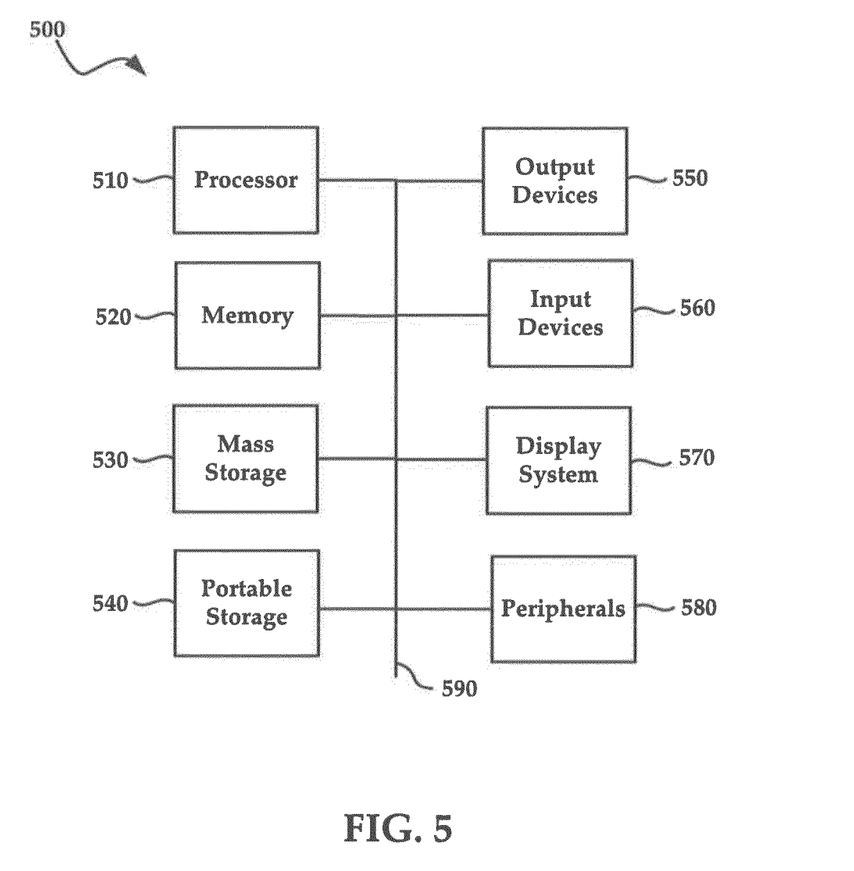
FIG. 5 illustrates an exemplary computing system that may be used to implement embodiments according to the present technology.

In some embodiments, a reader device, similar to computing system 500 of FIG. 5 may be utilized to personalize a personalizeable digital media publication. In addition to comprising memory, a processor, and other ancillary hardware and software that would be known to one of ordinary skill in the art, the reader device may comprise a touchscreen device (e.g., touchscreen panel) that allows for tactile, gesture, or stylus-based input into the reader device. In general, the reader device may be configured to receive a digital media publication, where the digital media publication comprises characteristics for personalization of a portion of the digital media publication. Also, the reader device may place the portion of the digital media publication in an editable mode, such as when an individual clicks an "Autograph" (see FIG. 3A). Additionally, the reader device may also receive personalization input according to the characteristics for personalization via the touchscreen device, and/or store a personalized digital media publication in any of the memory, a remote storage media, or combinations thereof.

Although many of the embodiments described above contemplate the personalization of publications after the publications have been published, it will be understood that in some instances a publication may be personalized before the publication is published. For example, an author may pre-autograph a predetermined number of publications before the publications are available for purchase by the public.

Figure 4:
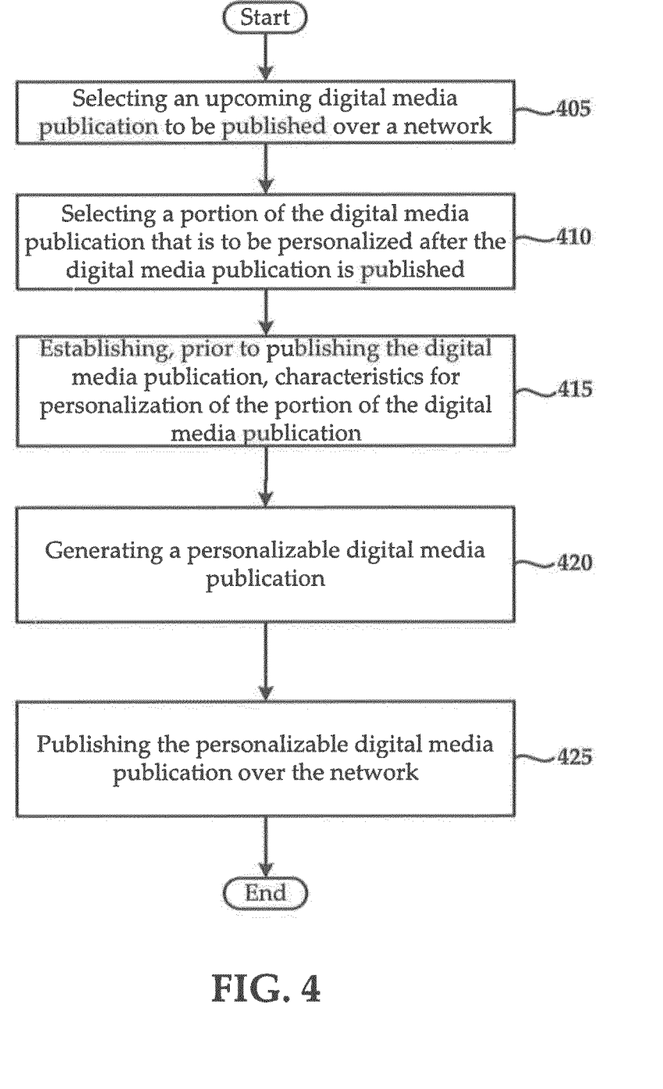
FIG. 4 is a flowchart of an exemplary method for managing a personalizeable digital media publication.

FIG. 4 is a flowchart of an exemplary method for managing a personalizeable digital media publication. The method may comprise a step 405 of selecting an upcoming digital media publication to be published over a network. Next the method may comprise a step 410 of selecting, prior to publishing the digital media publication, a portion of the digital media publication that is to be personalized after the digital media publication is published. For example, the portion may include a title page, any section or subsegment of a page, multiple pages, cover art, and so forth.

The method may also comprise a step 415 of establishing, prior to publishing the digital media publication, characteristics for personalization of the portion of the digital media publication. Again, these characteristics may be defined by the developer of the publication.

After establishing the characteristics for the publication, the method may include a step 420 of generating a personalizeable digital media publication, followed by a step 425 of publishing the personalizeable digital media publication over the network.

FIG. 5 illustrates an exemplary computing system 500 that may be used to implement an embodiment of the present technology. The system 500 of FIG. 5 may be implemented in the contexts of the likes of system 105 (FIG. 1). The computing system 500 of FIG. 5 includes one or more processor units 510 and main memory 520. Main memory 520 stores, in part, instructions and data for execution by processor unit 510. Main memory 520 may store the executable code when in operation. The system 500 of FIG. 5 further includes a mass storage device 530, portable storage device(s) 540, output devices 550, input devices 560, a display system 570, and peripherals 580.

The components shown in FIG. 5 are depicted as being connected via a single bus 590. The components may be connected through one or more data transport means. Processor unit 510 and main memory 520 may be connected via a local microprocessor bus, and the mass storage device 530, peripheral device(s) 580, portable storage device(s) 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 may store the system software for implementing embodiments of the present technology for purposes of loading that software into main memory 520.

Portable storage device 540 operates in conjunction with a portable non-volatile storage medium, such as a floppy disk, compact disk, digital video disc, or USB storage device, to input and output data and code to and from the computer system 500 of FIG. 5. The system software for implementing embodiments of the present technology may be stored on such a portable medium and input to the computing system 500 via the portable storage device 540.

Input devices 560 provide a portion of a user interface. Input devices 560 may include an alphanumeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. Peripheral device(s) 580 may include a modem or a router.

The components provided in the computer system 500 of FIG. 5 are those typically found in computer systems that may be suitable for use with embodiments of the present invention and are intended to represent a broad category of such computer components that are well known in the art. Thus, the computer system 500 of FIG. 5 may be a personal computer, hand held computing device, telephone, mobile computing device, workstation, server, minicomputer, mainframe computer, or any other computing device. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalent.

What is claimed is:

1. A method for managing a personalized digital media publication, the method comprising:
    selecting, by a data processing device, an upcoming digital media publication to be published over a network;
    selecting, by the data processing device, prior to publishing the digital media publication, a portion of the digital media publication that is to be personalized after the digital media publication is published;
    establishing, by the data processing device, prior to publishing the digital media publication, characteristics for personalization of the portion of the digital media publication;
    designating, by the data processing device, the characteristics for personalization of the portion of the digital media publication by defining a predefined time or a predefined location to perform personalization;
    wherein the designating is performed prior to publishing of the digital media publication;
    publishing, by the data processing device, the digital media publication over the network;
    determining, by the data processing device, after the publishing, that the predefined time or the predefined location have been satisfied; and
    based on the determining, allowing the portion of the digital media publication to be personalized.

2. The method according to claim 1, wherein the upcoming digital media publication is any of an e-book, an audio file, an audiovisual file, a visual file, or any combination or permutation thereof.

3. The method according to claim 1, wherein the portion of the personalized digital media publication is any of a title page, a cover, a plurality of pages, or any combination or permutation thereof.

4. The method according to claim 1, wherein the characteristics for personalization of the portion of the personalized digital media publication include any of programming for an e-signature, a recordable file, or a photograph to be respectively entered, recorded, or taken at a time the personalized digital media publication is personalized after publication.

5. The method according to claim 1, the method further comprising: receiving, by the data processing device, a personalization for the personalized digital media publication after publication, the personalization being performed at least in part by an author of the personalized digital media publication.

6. The method according to claim 1, wherein the characteristics for personalization of the portion of the personalized digital media publication include designation of an entity to perform at least in part personalization of the personalized digital media publication.

7. The method according to claim 1, the method further comprising:

sharing an indicia on a social network, the indicia evidencing personalization of a copy of the personalized digital media publication.

8. The method according to claim 1, the method further comprising:
sending over the network after publishing the personalized digital media publication additional characteristics for personalization of the portion of the personalized digital media publication.

9. The method according to claim 1, the method further comprising:
transacting a fee over the network after publishing the personalized digital media publication.

10. The method according to claim 9, wherein the fee is for personalization of the personalized digital media publication.

11. The method according to claim 1, the method further comprising:
determining, by the data processing device, a purchase of the personalized digital media publication, and upon the determining of the purchase:
personalizing the digital media publication after the purchase of the personalized digital media publication; and
transacting a fee over the network for the personalizing of the digital media publication.

12. A method for generating a digital media publication for personalization, the method comprising:
selecting, by a data processing device, a digital media publication to be published;
selecting, by the data processing device, prior to publishing the digital media publication, a portion of the digital media publication that is to be personalized;
establishing, by the data processing device, prior to the publishing, characteristics for personalization of the portion of the digital media publication;
designating, by the data processing device, the characteristics for personalization of the portion of the digital media publication by defining a predefined time or a predefined location to perform personalization;
wherein the designating is performed prior to publishing of the digital media publication;
and
generating, by the data processing device, a digital media publication for the personalization.

* * * * *